United States Patent

[11] 3,607,057

[72] Inventors Eulas W. Henderson
Borger;
Robert E. Dollinger, Phillips, both of Tex.
[21] Appl. No. 731,522
[22] Filed May 23, 1968
[45] Patented Sept. 21, 1971
[73] Assignee Phillips Petroleum Company

[54] CARBON BLACK PROCESS AND REACTOR
9 Claims, 2 Drawing Figs.
[52] U.S. Cl. .................................................. 23/209.4,
23/259.5
[51] Int. Cl. ................................................. C09c 1/50
[50] Field of Search .................................... 23/209.4,
209.6, 259.5; 260/679; 23/277

[56] References Cited
UNITED STATES PATENTS
2,682,450 6/1954 Sweigart et al. ............... 23/259.5
2,790,838 4/1957 Schrader ....................... 260/679

| | | | |
|---|---|---|---|
| 3,079,236 | 2/1963 | Heller et al. ................... | 23/209.4 |
| 3,220,803 | 11/1965 | Billi ............................... | 260/679 X |
| 3,256,065 | 6/1966 | Latham ......................... | 23/259.5 |
| 3,375,075 | 3/1968 | Ruble ............................ | 23/209.4 |
| 3,420,632 | 1/1969 | Ryan .............................. | 23/209.4 |
| 3,355,247 | 11/1967 | Krejci et al. ................... | 23/209.4 |

*Primary Examiner*—Edward J. Meros
*Attorney*—Young and Quigg

ABSTRACT: Process and apparatus for the production of carbon black wherein an oxygen-containing gas, with or without fuel, is introduced into an axial zone of a reactor and passed through a diametrally restricted section of said zone wherein it is commingled with hydrocarbon feed, the mixture passed into at least one stepped zone having a cross-sectional area greater than the cross-sectional area of said axial zone wherein it is expanded, the expanded mixture passed into a combustion zone and contacted therein with combustion gases, and the resulting mass passed into a reaction zone wherein the hydrocarbon feed is pyrolytically decomposed into carbon black.

INVENTORS
E. W. HENDERSON
R. E. DOLLINGER

CARBON BLACK PROCESS AND REACTOR

This invention refers to a process and to apparatus for producing carbon black. In one of its more specific aspects, it refers to an improved process and apparatus for the production of carbon black. Carbon black, which is widely used in rubber production, is required by industrial users in a wide range of product specifications. For various reasons, only a comparatively small proportion of the carbon blacks for which specifications have been developed can be produced in any one reactor. Accordingly, efforts have been made to develop a reactor which would produce a wide range of carbon black products.

There has now been developed a carbon black process and a carbon black reactor for producing a wider range of carbon black products. According to the process of this invention, there is provided a method for producing carbon black by the pyrolytic decomposition of a hydrocarbon which comprises introducing a hydrocarbon feedstock and free oxygen-containing gas and combustible gases into a first zone, passing said reactants through a zone proximate the discharge of the charge oil nozzle at high velocities to form a reactant mixture, expanding the reactants into a second zone, and passing the reactants into a third zone into which a quantity of combustion gases are introduced to form a reactant mass, and passing the reactant mass into a fourth zone where at least a portion of the carbonaceous material is pyrolytically decomposed to form carbon black.

There has also been invented a reactor for the practice of this invention, this reactor comprising a multitude of axially aligned, contiguous reaction zones, the first reaction zone adapted for the introduction of the reactants, the first reaction zone having a choke or restriction positioned therein to form a passageway of decreased cross-sectional area therein, said passageway being adapted to permit the projection of the charge oil nozzle therethrough and to direct the passage of reactants therethrough proximate the oil discharge nozzle, a second reaction zone in open communication with the first reaction zone, the second zone having a diameter greater than the diameter of the first reaction zone, the third reaction zone in open communication with the second reaction zone and having a diameter greater than the diameter of the second reaction zone, said third reaction zone being adapted for the introduction of additional reactants, a fourth reaction zone in open communication with the third reaction zone, the fourth reaction zone being adapted for the recovery of carbon black therefrom.

Accordingly, it is an object of this invention to provide an improved process for producing carbon black.

It is another object of this invention to provide an improved reactor for producing carbon black.

These, and other objects, will become more fully apparent from the following discussion.

In one of the conventional prior art processes, carbon black is produced by introducing a portion of the reactants into the first, or axial zone, expanding these reactants into a second zone into which a second portion of the reactants is introduced and conducting the reaction mass thus formed into a third zone where the principal portion of the carbon black is produced and from which the carbon black produced is removed. In this reactor in which this prior art process is conducted, these zones exist in axial, contiguous relationship and the second, or combustion, zone has a diameter greater than the diameter of the axial zone.

It has now been discovered that if this reactor is modified to the extent of providing a choke or restriction in the axial zone and, in addition, to the extent of interposing at least one zone of intermediate, substantially constant, diameter between the axial zone and combustion zone, a wider range of carbon blacks can be produced in the same reactor.

Various embodiments of the process and of the reactor exist. One of these consists of a choke having a cylindrical passageway therethrough, the choke being movably positionable along the length of the axial zone to the extent of extending into at least a portion of the zone interposed between the axial zone and combustion zone. This interposed zone will be referred to as the stepped zone, the effect of its interposition into the reactor being to produce a reactor having an axially stepped tunnel.

In another embodiment of this invention, the passageway of the choke is of variable diameter through its length, that is, the diameter of the passageway varies along its length through the choke.

In another embodiment of this invention, there are interposed between the axial zone and the combustion zone a plurality of stepped zones each of which has a substantially constant diameter greater than the diameter of the axial zone but less than the diameter of the combustion zone, the diameter of the individual stepped zones increasing in the direction from the axial zone to the combustion zone, that is, in the direction of the flow of the hydrocarbon reactants through the reactor.

In order to facilitate an understanding of this invention, reference is made to the attached drawings which show two embodiments of this invention.

Figure 1:
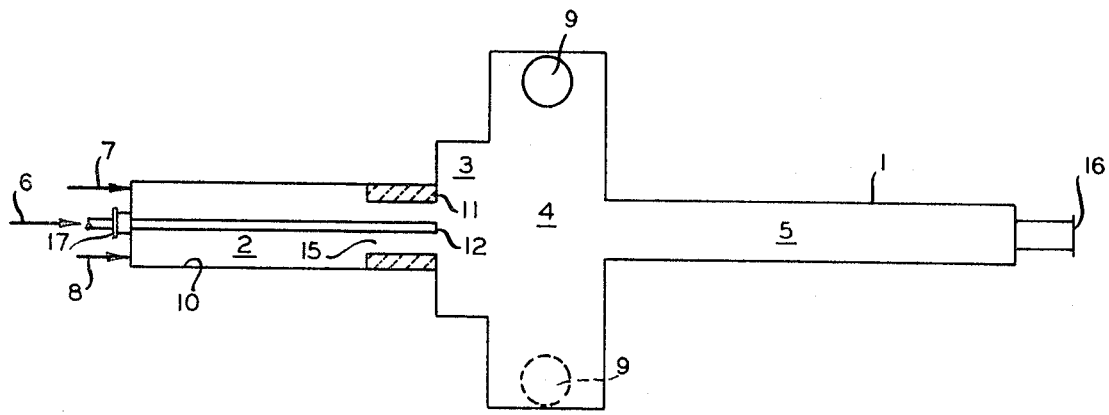
FIG. 1 is an elevation of an axial tunnel reactor illustrating one embodiment of this invention.

Referring now to FIG. 1, there is shown in general outline a carbon black reactor 1, devoid of its exterior shell and insulation. Reactor 1 has axial zone 2, combustion zone 4, and reaction zone 5. Hydrocarbon charge oil, or make-oil, is injected into axial zone 2 through conduit 6 which is equipped with a discharge nozzle 12. Axial zone 2 is also adapted for the introduction of a free oxygen-containing gas thereinto through conduit 7 and for the introduction of combustible gas therein to through conduit 8, these commingling in section 2. It will be noted that oil nozzle 12 is adapted to vary the extent of its extension into zone 2, that is, the extent to which it extends into axial zone 2 is alterable through packing gland 17 exterior of the reactor.

Combustion zone 4 is equipped with entries 9 which consists of one or more points for the introduction of combustion air and fuel or combustible gases and, if desired, some portion of the charge oil.

Reactor section 5 is adapted with outlet 16 through which the carbon black produced in section 5 is removed from the reactor.

Positioned within axial tunnel section 2 is choke 11 which is formed, for example, of a cylinder positioned with its outer wall adjacent to the interior wall of the axial zone 2. Passageway 15 through choke 11 is large enough to accommodate the withdrawal of nozzle 12 therethrough. Reactants introduced from conduits 7 and 8 in axial section 2 pass through passageway 15 of choke 11, their velocities being increased due to the smaller flow area of passageway 15. Choke 11 can be positioned anywhere along wall 10 of axial zone 2.

Interposed between zone 2 and zone 4 is stepped zone 3. Stepped zone 3 has a substantially constant diameter which is greater than that of axial zone 2 but less than the diameter of combustion zone 4.

It will be seen that the reactor can be operated so that the reactants introduced into axial zone 2 are accelerated in velocity while passing through passageway 15 of choke 11 proximate the discharge of charge oil from nozzle 12 to form a reactant mass which is subsequently expanded into stepped zone 3 and is again expanded into combustion zone 4, into which an additional portion of the reactants are introduced through entries 9. Both choke 15 and nozzle 12 are adjusted independently of each other along the length of axial tunnel 2. Choke 11 is adapted for adjustment in location from any position from the inlet wall of axial tunnel 2 to a point within stepped zone 3. Charge oil nozzle 12 is similarly adjustable.

It will be appreciated that a considerable increase in velocity is imparted to that mixture of gas passing through the passageway 15 of choke 11 as compared to that velocity of the gases through the unrestricted portion of axial tunnel 2.

It will be further appreciated that by varying the configuration of the passageway 15 through choke 11, a considerable change in direction can be effected to the flow of the gases through passageway and that, depending upon the amount of gases introduced into axial section 2, either turbulent or laminar flow thereto can be effected by adjustment of the diameter of passageway 15 through choke 11. Due to the length of choke 11 in relation to the length of the axial tunnel 2, it is preferable that choke 11 be positionable to encompass nozzle 12 at its most withdrawn position from combustion chamber 4.

It will be further appreciated that if the configuration of passageway 15 of choke 11 is made other than cylindrical, for example the configuration of a truncated cone, the gases can be directed angularly across the discharge from nozzle 12.

Figure 2:
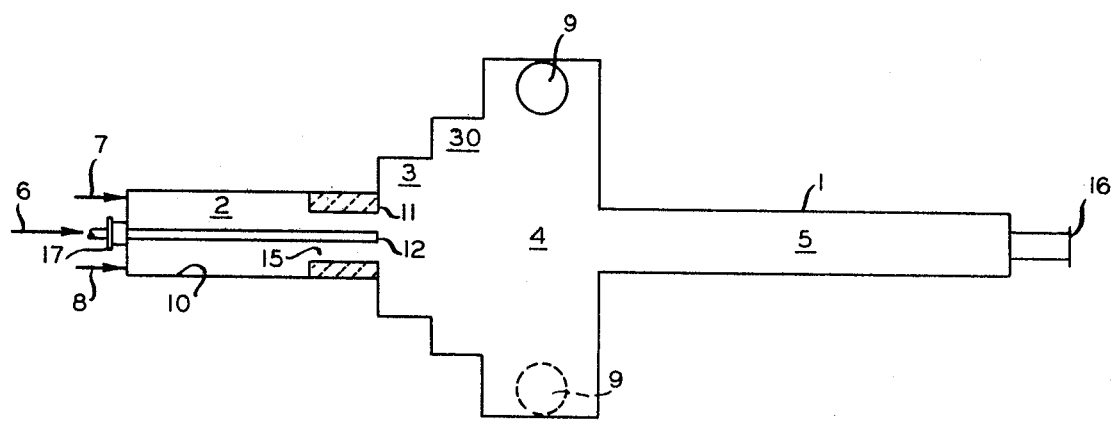
FIG. 2 is an elevation of another embodiment showing both the installation of the choke and the axial zone and a plurality of interposed zones between the axial zone and the combustion zone.

FIG. 2 illustrates another embodiment of the invention in which like numbers are used to designate like parts with reference to FIG. 1.

The prior description is generally applicable to the embodiment shown in FIG. 2; however, in this embodiment, a second stepped zone 30 is interposed between first stepped zone 3 and combustion zone 4. In other words, there is imparted to the gases after exiting axial tunnel 2, two expansions, one into stepped zone 3 and one into stepped zone 30 prior to their introduction into zone 4.

It will be appreciated that while but two stepped zones are shown in this figure, a larger number of stepped zones can be employed.

The modifications previously mentioned in reference to FIG. 1 are also applicable to FIG. 2.

As previously mentioned, the apparatus of subject invention permits wider range of the reactor operability in a process which affects the carbon black product quality and the yield of carbon black produced from the process. These affects are shown in the following examples.

EXAMPLE I

The carbon black reactor of the previous description was operated in the process of this invention, under conditions indicated below.

Three individual runs were made, one in a conventional axial tunnel reactor having an axial zone of 12 inches diameter, a combustion chamber or zone having a diameter of 37 inches and a reaction zone having a diameter of 10 inches. These results are shown in the data below as 12 inches × 10 inches reactor.

A second run was made in a conventional axial tunnel reactor having an axial zone of 13 inches diameter, a combustion chamber having a diameter of 37 inches and a reaction zone having a diameter of 10 inches. This is shown in the data below as a 13 inches × 10 inches reactor.

A third run was made practicing the method of this invention in apparatus of this invention, that is, in apparatus having an axial zone of 13 inches diameter, the axial zone having a choke positioned therein, the choke having a passageway diameter of 12 inches, an interposed stepped zone of 17 inches diameter, a combustion zone of 37 inches diameter and a reaction zone having a 10-inch diameter. This is shown in the data below as 13 inches – 12 inches × 17 inches × 10 inches reactor.

Data were as follows:

TABLE I

| Run No. | 1 | 2 | 3 |
|---|---|---|---|
| Reactor Type | Axial | Axial | Axial Choked Stepped |
| Reactor Size | 12"×10" | 13"×10" | 13"–12"×17"×10" |
| Choke | No | No | 12" Passageway |
| Stepped | No | No | 17" Diameter |
| Oil Rate, g.p.h. | 377 | 350 | 375 |
| Oil Nozzle Location, In. | 13 | 14 | 14 |
| Axial Air, Mscfh | 45 | 45 | 60 |
| Axial Gas, Mscfh | – | – | – |

TABLE I—Continued

| Run No. | 1 | 2 | 3 |
|---|---|---|---|
| Reactor Type | Axial | Axial | Axial Choked Stepped |
| Combustion Air, Mscfh | 185 | 185 | 14.2 |
| Combustion Gas, Mscfh | 14.2 | 14.0 | 12.2 |
| Air/Oil Rate, s.c.f./gal. | 611 | 657 | 587 |
| Reactor Length, In. | 88 | 65 | 96 |
| Yield, % C. to Black | 50.3 | 48.6 | 50.4 |
| Product Quality | | | |
| Photolometer, % | 91 | 95 | 93 |
| $N_2SA$, m.²/g. | 86 | 97 | 87 |
| DBP, cc./100g. | 144 | 147 | 149 |

In the above data, and in the data to follow, "oil nozzle location" indicates the position of the hydrocarbon nozzle within the axial section, in inches, measured from the inlet of the combustion section, in a direction upstream into the axial section, to the discharge apertures of the nozzle.

These data indicate the operability of the process of this invention to produce a black which, at comparable photolometer values, possess a surface area comparable to that black produced in the conventional axial reactor, not withstanding the lower air to oil ratio employed. While the data do not indicate that axial gas was introduced into the axial zone, it is evident that such introduction could have been made.

EXAMPLE II

A second series of runs was made. In Run 4, a stepped, unchoked reactor having an axial zone of 15 inches diameter, a stepped zone of 17 inches diameter and 3 inches length, and a reaction zone of 10 inches diameter was employed, that is, a reactor size 15 inches × 17 inches × 10 inches. In comparison a choked and stepped reactor, size 13 inches – 12 inches × 17 inches × 10 inches, was employed, this reactor being a reactor of the same size as that used in Run 3 of example I. The length of the 17 inches diameter stepped zone was 3 inches.

TABLE II

| Run No. | 4 | 5 |
|---|---|---|
| Reactor Type | Axial Stepped | Axial Choked Stepped |
| Reactor Size | 15"×17"×10" | 13"–12"×17"×10" |
| Choke | No | 12" Passageway |
| Stepped | 17" | 17" Diameter |
| Oil Rate, g.p.h. | 294 | 296 |
| Oil Nozzle Location, In. | 16 | 16 |
| Axial Air, Mscfh | 55 | 45 |
| Axial Gas, Mscfh | 3.7 | – |
| Combustion Air, Mscfh | 175 | 185 |
| Combustion Gas, Mscfh | 11.7 | 14.1 |
| Air/Oil Rate, s.c.f./gal. | 782 | 777 |
| Reactor Length, In. | 92 | 56 |
| Yield, % C. to Black | 45.3 | – |
| Product Quality | | |
| Photolometer, % | 92 | 93 |
| $N_2SA$, m.²/g. | 87 | 102 |
| DBP, cc./100g. | 147 | 143 |

These data indicate that when producing carbon black of the same photolometer value, this invention, when practiced in a smaller reactor, at comparable charge oil rates, produces a higher surface area black.

A comparison of Run 5, above, with Run 3 of table I indicates that within the same axial stepped choked reactor, carbon blacks of widely different properties can be produced.

EXAMPLE III

An additional run was made in the reactor employed in Run 5, for the purpose of increasing the distance from the nozzle location to the combustion zone to 18 inches, while simultaneously increasing reactor length but decreasing the air to oil ratio to prevent after treating, in order to indicate the wide operability of the process and produce a lower surface area black. Results were as follows:

TABLE III

| Run No. | 6 |
| --- | --- |
| Reactor Type | Axial Choked Stepped |
| Reactor Size | 13"–12"×17"×10" |
| Choke | 12" Passageway |
| Stepped | 17" Diameter |
| Oil Rate, g.p.h. | 376 |
| Oil Nozzle Location, In. | 18 |
| Axial Air, Mscfh | 45 |
| Axial Gas, Mscfh | 0 |
| Combustion Air, Mscfh | 185 |
| Combustion Gas, Mscfh | 14.2 |
| Combustion Oxygen, Mscfh | 3.7 |
| Air/Oil Rate, s.c.f./gal. | 612 |
| Reactor Length, In. | 94 |
| Yield, % C. to Black | 51.2 |
| Product Quality | |
| Photolometer, % | 85 |
| $N_2SA$, m.$^2$/g. | 76 |
| DBP, cc./100g. | 142 |

These data indicate the wide range of operability of the process and apparatus of this invention, particularly in respect to the oil nozzle location, length of reactor, air-oil ratio, performance with axial air as the only reactant other than oil being introduced into the axial zone, the introduction of oxygen into the combustion zone as well as high conversion and the low surface area black produced.

In the above runs in which an axial stepped chocked reactor was used, the choke was 4½ inches long, and the passageway through the choke was cylindrical and of uniform diameter throughout its length. In all instances the choke was positioned with its downstream edge coinciding with the upstream edge of the first stepped zone. The total length of the axial stepped tunnel was 45 inches, including the length of the stepped zone which was 3 inches.

Similarly, the combustion zone in all reactors was 12 inches long and 37 inches in diameter. Reaction zone diameters and lengths were as indicated in the various data.

However, it is not intended that the invention be limited to reactors possessing these dimensions since choke characteristics and stepped zone characteristics, in addition to those delineated above are known to be suitable. For example, chokes of any lengths may be employed. Generally, it is only desirable that the choke be shorter in length than the length of the axial tunnel, and of suitable length to direct the flow of gases therethrough along an established path of flow. Chokes generally having a length of about 4 to about 8 inches are satisfactory.

Similarly, any passageway configuration can be employed although it is preferable that the passageway be of cylindrical configuration or of a configuration which decreases in area in the direction of flow therethrough.

The area of the passageway through the choke can vary from about 0.04 to about 0.80 that of the area of the unrestricted axial section, preferably from about 0.25 to about 0.65 that of the area of the unrestricted axial section.

Similarly, the choke can be positioned at any point along the length of the axial section, or at any point in relation to the discharge nozzle of the charge oil introductory line, it only being preferable that some unrestricted area of the axial section be provided upstream of the choke for the introduction of at least a portion of the reactants thereinto, and from which such reactants have their velocities increased as they pass through the choke.

Any number of stepped zones of any diameter and of any length have been found effective. While the above runs were conducted in reactors having a single stepped zone, any number of stepped zones may be employed. Similarly, the stepped zones may be of any length, lengths of from about 1 inch to about 30 inches, preferably from about 3 inches to about 20 inches having been found preferable.

Also, the stepped zones may be of any diameter intermediate the diameter of the axial zone and the diameter of the combustion zone. If more than a single stepped zone is supplied, the zones are arranged in the order of increasing diameter in the direction of flow from the axial section to the combustion section.

While the method and apparatus of this invention have been described and explained in relation to certain embodiments, the invention is not meant to be limited thereto but is intended to be inclusive of reasonable variations thereof.

What is claimed is:

1. A process for the production of carbon black by the pyrolytic decomposition of a hydrocarbon feed by contacting said hydrocarbon feed with hot combustion gases produced by the oxidation of a combustible gas with a free oxygen-containing gas which comprises:
    a. introducing a free oxygen-containing gas into a first section of an axial zone of a carbon black reactor;
    b. introducing hydrocarbon feed downstream of the locus of introduction of said free oxygen-containing gas into a diametrally restricted portion of said axial zone, said portion of said axial zone having a cross-sectional area less than the cross-sectional area of said first section;
    c. passing said first free oxygen-containing gas through said first section at a first velocity;
    d. passing said oxygen-containing gas through said diametrally restricted portion of said axial zone and into contact with said hydrocarbon feed at a velocity greater than said first velocity forming a reactant mass;
    e. passing said reactant mass into at least one stepped zone having a cross-sectional area greater than the cross-sectional area of said axial zone wherein said mass is expanded;
    f. passing the expanded reactant mass into a combustion zone having a diameter greater than said zone and into contact with combustion gases introduced through the periphery of said combustion zone under conditions to form carbon black;
    g. passing the reactant mass into a reaction zone wherein carbon black is formed; and,
    h. recovering the carbon black.

2. The process as defined in claim 1, wherein the hydrocarbon feed is introduced into the axial zone upstream of the diametrally restricted section.

3. The process as defined in claim 1 in which the reactant mass from the axial section is expanded by passage into a plurality of stepped zones contiguously positioned between said axial section and said combustion section, each of said stepped sections being of substantially uniform diameter and having a greater diameter than the intermediate preceding stepped section.

4. The process as defined in claim 3 in which said first gas is accelerated in passing through said restricted portion of the axial zone to a velocity of 1.04 to about 1.8 times said first velocity.

5. The process as defined in claim 3 in which the reactant mass is expanded three times in successively positioned stepped zones.

6. A carbon black reactor which comprises:
    a. an axial section adapted with conduit means for the introduction of hydrocarbon feed and gaseous reactants;
    b. a choke positioned within said axial section;
    c. at least one stepped section in axial contiguous alignment with said axial section, said stepped section having a substantially uniform diameter greater than the diameter of said axial section;
d. a combustion section in axial contiguous alignment with said stepped section, said combustion section having a diameter greater than the diameter of said stepped section and being adapted with conduit means through its periphery for the introduction of reactants thereinto; and
e. a reaction section in axial alignment with said combustion section and adapted with conduit means for recovery of carbon black.

7. The carbon black reactor as defined in claim 6 in which said choke is movably positioned within said axial section.

8. The carbon black reactor as defined in claim 7 in which said choke is positioned within said axial section downstream from the locus of discharge of said conduit means for the introduction of hydrocarbon feed and gaseous reactants.

9. The carbon black reactor as defined in claim 8 in which the passageway through said choke has an area from about 0.04 to about 0.8 of the area of said axial section.

UNITED STATES PATENT OFFICE

CERTIFICATE OF CORRECTION

Patent No. 3,607,057     Eulas W. Henderson et al     Dated: September 21, 1971

It is certified that error appears in the above-identified patent and that said Letters Patent are hereby corrected as shown below:

Claim 1, column 6, line 46, after "said" insert --- stepped ---.

Signed and sealed this 7th day of March 1972.

(SEAL)
Attest:

WARD M. FLETCHER, JR.            ROBERT GOTTSCHALK
Attesting Officer                  Commissioner of Patents